United States Patent Office 3,535,386
Patented Oct. 20, 1970

3,535,386
NOVEL DIETHYNYLCARBINOLS
Robert D. Dillard, Indianapolis, Ind., assignor to Eli Lilly and Company, Indianapolis, Ind., a corporation of Indiana
No Drawing. Filed Feb. 19, 1968, Ser. No. 706,637
Int. Cl. C07c *33/04;* A01n *9/24*
U.S. Cl. 260—617
6 Claims

ABSTRACT OF THE DISCLOSURE

Cycloalkyldiethynylcarbinols, prepared from phenyl cycloalkylcarboxylates and metalloacetylides, useful as pre-emergent herbicides.

SUMMARY OF THE INVENTION

This invention relates to novel compounds useful for eliminating weed grasses and selected broadleaf weeds in growing crops. More particularly the compounds of this invention prevent the germination of both grass and broadleaf weeds with little or no effect on seedlings or mature crops.

The compounds of this invention can be represented by the formula

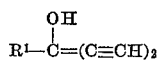

wherein $R^1$ is $C_3$–$C_7$ cycloalkyl, $C_5$–$C_{10}$ bicycloalkyl, or adamantyl.

"$C_3$–$C_7$ cycloalkyl" includes cyclopropyl, cyclobutyl, cyclopentyl, cyclohexyl, and cycloheptyl.

"$C_5$–$C_{10}$ bicycloalkyl" includes norbornyl, bicyclo-[3.1.0]hexyl, spiro[4.5]decyl, spiro[3.4]octyl, spiro[3.3]-heptyl, bicyclo[2.2.1]heptyl, bicyclo[3.2.1]octyl, bicyclo-[1.1.4]octyl, bicyclo[1.1.1]pentyl, and the like.

The compounds of this invention are useful in controlling the germination of unwanted crop or weed seeds when applied to the soil after the desired crops have passed the two-leaf stage. The compounds can be applied randomly at the proper dose without regard to weather conditions or the like since contact with the growing plant does not produce significant injury or death.

The ability of the compounds of this invention to kill germinating plants was demonstrated by the following experimental procedure: A soil was prepared consisting of one part masonry sand and one part shredded top soil blended together in a 25 x 35 cm. galvanized flat and patted down with a bench brush until level. A three-row marker was used to make 2½ cm. deep furrows in approximately two-fifths of the flat. Crop seeds consisting of four kernels of corn, five tomato seeds, five cotton seeds, and five soybean seeds were placed in these furrows. A four-row template was then placed on the remaining soil, and the indicated amounts of each of the following seeds were planted, one species to each section: velvet leaf 50–75 mg.; foxtail 300–400 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

On the day of planting or on the next day, the flat, prepared as above, was placed in a chamber equipped with a turntable and an air exhaust. The test compound, in the form of a spray-type emulsion or an aqueous suspension of a wettable powder, was applied to the flat with a modified De Vilbiss atomizer hooked to an air source. Twelve and one-half ml. of the composition containing the test compound in the appropriate concentration were applied to each flat either on the day of planting or the succeeding day. Injury rating and observations as to type of injury were made in either case eleven to twelve days after treatment. The injury rating scale used was as follows:

0—no injury
1—slight injury
2—moderate injury
3—severe injury
4—death
—not tested When more than one determination was carried out, an average value was calculated for the injury rating.

The following table sets forth a comparison of the results of pre-emergent testing of several compounds with the results of a similar post-emergent herbicide test. In the table, column 1 gives the name of the compound; column 2, the rate in terms of pounds per acre at which the compound was applied to the test flat; and columns 3 through 9, the injury rating for the particular plant seeds or seedlings.

PRE-EMERGENT VERSUS POST-EMERGENT CROP CONTROL

| Compound | Rate | Pre-emergent activity | | | | | | | |
|---|---|---|---|---|---|---|---|---|---|
| | | Corn | Cotton | Soybean | Velvet leaf | Foxtail | Pigweed | Crabgrass | Tomato |
| 3-cyclopropyl-1,4-pentadiyn-3-ol | 8 | 4 | 4 | 4 | 2 | 2 | 4 | 3 | |
| 3-cyclobutyl-1,4-pentadiyn-3-ol | 8 | 4 | 3 | 4 | 2 | 2 | 4 | 2 | |
| 3-cyclopentyl-1,4-pentadiyn-3-ol | 8 | 4 | 4 | 4 | 3 | 3 | 4 | 4 | |
| 3-cyclohexyl-1,4-pentadiyn-3-ol | 8 | 4 | 2 | 3 | 2 | 2 | 4 | 2 | |
| 3-(1-adamantyl)-1,4-pentadiyn-3-ol | 15 | | | | | | 4 | 2 | 1 |
| | | Post-emergent activity | | | | | | | |
| 3-cyclopropyl-1,4-pentadiyn-3-ol | 15 | | | | | | 0 | 0 | 0 |
| 3-cyclobutyl-1,4-pentadiyn-3-ol | 15 | | | | | | 1 | 1 | 1 |
| 3-cyclopentyl-1,4-pentadiyn-3-ol | 8 | 1 | 0 | 1 | 0 | 1 | 0 | 2 | |
| 3-cyclohexyl-1,4-pentadiyn-3-ol | 8 | 0 | 0 | 0 | 0 | 0 | 0 | 0 | 0 |
| 3-(1-adamantyl)-1,4-pentadiyn-3-ol | 15 | | | | | | 0 | 0 | 0 |

The compounds of this invention are prepared in the following way. The appropriate commercially available cycloalkylcarboxylic acid chloride is treated with phenol, cresol, xylol, or the like in the presence of an organic base as an acid scavenger to yield the intermediate phenyl ester. The phenyl ester is then reacted with an alkali metal acetylide to yield the desired carbinol.

Organic bases which are useful as acid scavengers for the above-described esterification reaction include piperidine, triethylamine, trimethylamine, N-ethylpiperidine, and the like.

Alkali metal acetylides which are useful in preparing the carbinol include sodium acetylide, potassium acetylide, lithium acetylide and the like.

The following example will serve to illustrate the general procedure for the preparation of the compounds of the present invention, but is not meant to limit its scope in any manner.

EXAMPLE

A stirred solution of 94 g. (1.0 mole) of phenol in 250 ml. of pyridine was treated dropwise with 118.5 g. (0.85 mole) of cyclobutylcarboxylic acid chloride. The exothermic reaction which ensued was controlled by external cooling with a salt water-ice bath. After addition was complete, the mixture was stirred for an additional 30 minutes at ice bath temperatures, then allowed to warm to room temperature during an additional 2 hours. Methylene chloride was added as a solvent and the resulting mixture was washed sequentially with water, dilute hydrochloric acid, dilute sodium hydroxide, and water. After drying with anhydrous magnesium sulfate, the solvent was removed and the resulting product, phenyl cyclobutylcarboxylate, was distilled. Boiling point 104–106° C. at 4.4 mm. Hg. Yield 114.2 g. (76.5%).

A liquid ammonia solution of sodium acetylide was prepared by adding 60 g. (2.6 mole) of sodium to an excess of acetylene gas in liquid ammonia. The phenyl cyclobutylcarboxylate prepared above was dissolved in a minimum amount of methylene chloride and added dropwise to the sodium acetylide solution. The mixture was stirred for 2 additional hours, at the end of which time 2 liters of ether were added and the ammonia was allowed to evaporate while warming to room temperature. Small chunks of ice were then added slowly until the vigorous action effected upon their addition had ceased, followed by 1.5 liters of water. The organic layer was separated, washed 3 times with water, and dried with anhydrous magnesium sulfate, and the solvent was evaporated in vacuo. The resulting liquid was triturated with petroleum ether until crystalline, then recrystallized from a fresh portion of petroleum ether.

The resulting product, 3-cyclobutyl-1,4-pentadiyn-3-ol, weighed 13.2 g. (15%).

*Analysis.*—Calcd.. for $C_9H_{10}O$ (percent): C, 80.56; H, 7.51. Found (percent): C, 80.30; H, 7.54.

In addition to 3-cyclobutyl-1,4-pentadiyn-3-ol, the following compounds were prepared by the method of the foregoing example.

3-cyclopropyl-1,4-pentadiyn-3-ol; boiling point: 60–65° C. at 4 mm. Hg
3-cyclopentyl-1,4-pentadiyn-3-ol; melting point: 50–52° C.
3-cyclohexyl-1,4-pentadiyn-3-ol; melting point: 73–75° C.
3-norbornyl-1,4-pentadiyn-3-ol; melting point: 50–52° C.
3-(1-adamantanyl)-1,4-pentadiyn-3-ol; melting point: 113–115° C.

By the use of appropriately substituted starting materials, the following additional compound can be made by the foregoing method.

3-(2-bicyclo[3.1.0]hexyl)-1,4-pentadiyn-3-ol
3-(2-bicyclo[1.1.1]pentyl)-1,4-pentadiyn-3-ol
3-(2-spiro[3.3]heptyl)-1,4-pentadiyn-3-ol
3-(3-spiro[4.5]decyl)-1,4-pentadiyn-3-ol

I claim:
1. A compound represented by the formula

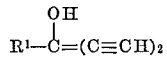

wherein $R^1$ is $C_3$–$C_7$ cycloalkyl, $C_5$–$C_{10}$ bicycloalkyl, or adamantyl.

2. A compound as in claim 1, said compound being 3-cyclopropyl-1,4-pentadiyn-3-ol.

3. A compound as in claim 1, said compound being 3-cyclobutyl-1,4-pentadiyn-3-ol.

4. A compound as in claim 1, said compound being 3-cyclopentyl-1,4-pentadiyn-3-ol.

5. A compound as in claim 1, said compound being 3-cyclohexyl-1,4-pentadiyn-3-ol.

6. A compound as in claim 1, said compound being 3-(1-adamantyl)-1,4-pentadiyn-3-ol.

References Cited

UNITED STATES PATENTS

| | | |
|---|---|---|
| 2,779,799 | 1/1957 | Hamlin. |
| 2,917,536 | 12/1959 | Holysz et al. |
| 3,019,264 | 1/1962 | Eschinazi. |
| 3,278,609 | 10/1966 | Koppe et al. |

OTHER REFERENCES

McLamore et al.: "J. Org. Chem." (1955), pp. 109–117, Q D 241.J6.

BERNARD UELFIN, Primary Examiner

J. E. EVAN, Assistant Examiner

U.S. Cl. X.R.

71—122; 260—468